Jan. 15, 1946.   F. D. MILES ET AL   2,392,860
PREPARATION OF PURE NITROGUANIDINE
Filed March 27, 1941
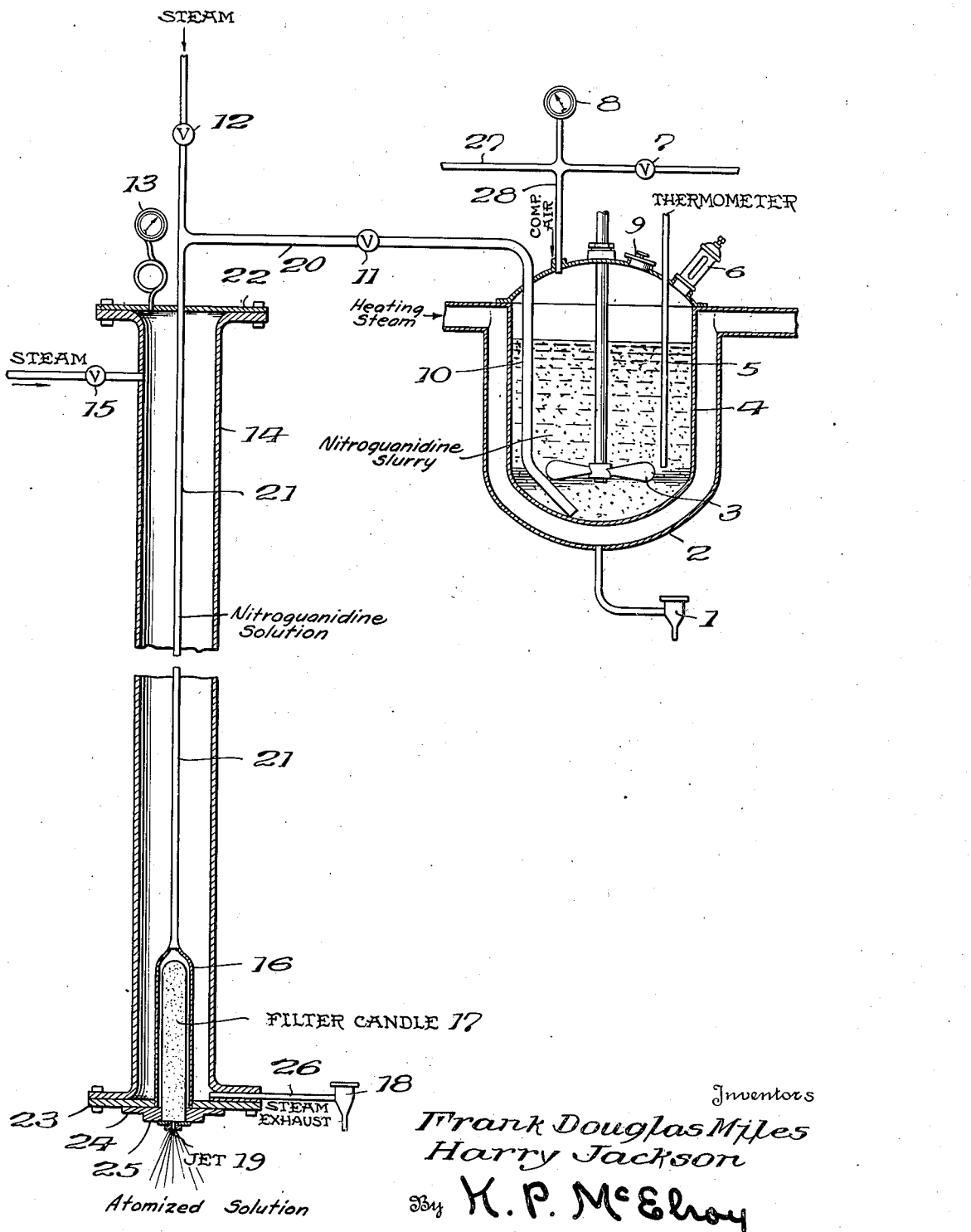
Inventors
Frank Douglas Miles
Harry Jackson
By K. P. McElroy
Attorney Patented Jan. 15, 1946

2,392,860

UNITED STATES PATENT OFFICE 2,392,860

PREPARATION OF PURE NITROGUANIDINE

Frank Douglas Miles, West Kilbride, and Harry Jackson, Saltcoats, Scotland, assignors to Imperial Chemical Industries Limited, a corporation of Great Britain Application March 27, 1941, Serial No. 385,534
In Great Britain October 11, 1940

9 Claims. (Cl. 260—564)

This invention relates to an improved process for purifying and crystallising nitroguanidine, and to products obtained thereby.

In the manufacture of nitroguanidine, guanidine nitrate is treated with sulphuric acid, and the crude nitroguanidine obtained by drowning the reaction mixture is always contaminated with impurity, and in particular occluded sulphuric acid, which renders it unsuitable for use in explosives technology. The harmful impurities can be removed by recrystallising the nitroguanidine from hot water, but under ordinary conditions the size of the crystals obtained by recrystallisation from hot water is too large to enable them to be used for many purposes in explosives technology for which the substance would otherwise be suitable, and the physical characteristics of the crystals are such that they are difficult to reduce in size by mechanical treatment. Nitroguanidine is difficultly soluble in most solvents and its best non-acid solvent is water. The solubility of nitroguanidine in boiling water is only about 9 per cent, but in superheated water under pressure its solubility rises rapidly with the temperature.

It has been proposed to prepare nitroguanidine free from sulphuric acid and in finely divided form by dissolving sufficient nitroguanidine in water to a temperature substantially above 100° C. under superatmospheric pressure to form a solution containing substantially more nitroguanidine than would saturate the water at 100° C., and then discharging the superheated solution into a cold liquid medium such as a mixture of ice and water. It has also been suggested to employ some other means of rapid cooling instead of discharging into a cold liquid medium, such, for example as discharging the superheated solution through a spray nozzle into a chamber or tower through which is passed heated air to remove the water vapor, or into any suitable liquid or gaseous medium which can be maintained at a sufficiently low temperature. The discharged and cooled solution precipitates the nitroguanidine in a finely subdivided state.

In dissolving the nitroguanidine, it would be desirable to employ as high a temperature range as possible, but at elevated temperatures nitroguanidine is hydrolysed in aqueous solution into ammonia, carbon dioxide and nitrous oxide, and once it has commenced the hydrolysis proceeds with rapidly accelerating velocity. Such decomposition represents a potential source of danger unless the temperature and time of heating in the pressure vessel are carefully regulated.

According to the aforesaid method of discharging the solution into ice and water, temperatures between about 130° C. and 160° C. were recommended, and it was stated that those between 140° C. and 150° C. were preferred in practice, the time required to heat up the contents of the dissolving tank and discharge them into a mixture of ice and water, being inconsiderable at these temperatures. The nitroguanidine water mixture would, however, be subjected to the high temperature for a substantially longer period if the discharge from the dissolving tank were through a spray nozzle instead of through an orifice of substantial cross section.

It would, therefore, be desirable to reduce the risk of an uncontrollable decomposition and consequent liability to explosion in a process for purifying nitroguanidine and reducing its crystal size depending on the sudden chilling of a hot aqueous solution of nitroguanidine made at superatmospheric pressure.

The decomposition of nitroguanidine in aqueous alkali is much more rapid than in water, and since the sulphuric acid associated with the nitroguanidine is mainly occluded and hence unavailable to any neutralising agent added to the slurry until the nitroguanidine has been dissolved as a result of the superheating, it has not hitherto been considered practicable to utilise a reagent adapted to neutralise the occluded sulphuric acid.

It is an object of the present invention to provide an improved method for the purification of nitroguanidine from the sulphuric acid associated with the method of its manufacture. It is also an object of the invention to obtain purified nitroguanidine in crystals of desirable uniformity and desirably small size. It is also an object of the invention to reduce the risk of an uncontrollable decomposition in a process for dissolving nitroguanidine in superheated aqueous solution and crystallising the nitroguanidine therefrom, or to reduce the amount of water required to form a superheated solution of nitroguanidine in such a process. It is a further object of the invention to render possible the use of a reagent capable of reacting with sulphuric acid to reduce the acidity of the product in a process for purifying nitroguanidine. Other objects will appear hereinafter.

According to our invention a supply of a slurry of nitroguanidine in an amount of water sufficient only to dissolve it at a temperature not below about 120° C. is maintained at a temperature not exceeding about 100° C. and a progressively renewed fraction thereof is caused to flow under pressure through a space in which it is progressively heated to a temperature sufficient to convert it into a solution, and the resulting solution is forthwith filtered and discharged, before any appreciable decomposition thereof has taken place, through a narrow orifice in the form of a cloud into a region at a pressure not substantially exceeding atmospheric. Preferably the temperature to which the solution has to be heated does not exceed 160° C. Using pure nitroguanidine the filter may be omitted.

According to a further feature of our invention, there is included in the slurry a substance which does not cause its pH, as measured at atmospheric temperature, to exceed 9, but which is adapted to effect a reduction in the acidity of the product, the amount of this material used being preferably sufficient to react with the whole of the sulphuric acid. For this purpose there may be most advantageously employed soluble salts of weakly alkaline reaction, for instance, borax, sodium acetate, potassium sulphite, di-sodium hydrogen phosphate, magnesium acetate, calcium acetate or potassium acetate, or substantially insoluble materials capable of neutralising sulphuric acid such as zinc oxide, calcium carbonate, lead carbonate, magnesium carbonate, barium carbonate or the like. The time for which the mixture may be safely exposed to temperatures above about 120° C. is the smaller the greater the alkalinity of the solution, and the higher the temperature, and it may amount to anything from about two minutes to more than an hour. But for a desirable throughput the time for which the mixture will be at a temperature exceeding 120° C. will seldom exceed 30 seconds and may conveniently be less than 10 seconds before it is discharged.

For convenience the vessel in which the slurry is heated to a temperature not exceeding about 100° C. will usually be of considerable capacity in relation to the surface of its walls, but the space in which the slurry is subsequently heated under pressure until the nitroguanidine dissolves should in practice be characterised by a large ratio of heating surface to volume, and the heating is conveniently carried out by heat exchange with a stream of heating fluid exterior to this space.

In putting the invention into effect, the slurry may be heated to a temperature not exceeding 100° C. in a vessel from which it may be transferred under pressure into a heating pipe in the terminal portion of which the resulting solution is filtered and discharged through a spray jet.

The invention will be further understood by reference to the accompanying drawing which represents a vertical section of one form of apparatus which may be used for the purposes of the present invention.

In the drawing 4 is a pot provided with a steam jacket 2, mechanical stirrer 3, thermometer 5, a safety valve 6 and a manhole cover 9; 26 is a compressed air line leading to the top and 10 is a transfer pipe springing from the bottom of the pot 4. 1 is a steam trap for the steam jacket 2; 7 is an air pressure regulating valve and 8 is a pressure gauge. 27 is a compressed air pipe leading to a blow-off not shewn. 11 is a regulating valve leading into the pipe 20 which leads into a vertical heating pipe 21. 14 is a flanged steam jacket and 15 a steam inlet valve. 12 is a valve controlling the entrance of steam from a source not shewn into the pipe 21. 22 is an upper cover bolted to the upper flange of the steam jacket 14, and 13 is a steam pressure gauge attached to it. 26 is a steam exhaust pipe leading to steam trap 18. 23 is an annular lower cover bolted to the flanged lower end of the steam jacket. The enlarged lower portion 16 of the tube 21 extends to the lower surface of the cover 23, and accommodates a filter candle 17, supported by an annular plate 24 flush with its lower end, and forms a tight joint with the cover 23 and the plate 24, and 25 is a collar screwed to the plate 24 housing a spray jet 19 providing the exit for the filtered solution.

The pot 4 may conveniently be made of cast iron and the jet 19 may be made of non-ferrous metal or stainless steel. The pipe 21 may be made of ferrous metal, for instance, steel or stainless steel, or of non-ferrous metal, for instance, copper. The metal employed should be a good conductor of heat. The filter candle may advantageously comprise fine mesh metal gauze, and the steam jacket should extend as nearly as possible to the jet.

In the operation of the aforesaid apparatus, the nitroguanidine and water and any weakly alkaline material to be used are introduced into the pot 4 leaving a space for expansion, and stirred by means of the mechanical stirrer 3 so as to maintain a slurry. Steam is run through the jacket 2 until a temperature not exceeding about 100° C. has been attained by the slurry, the manhole cover is closed, and the safety valve 6 is set to operate at a pressure somewhat higher than that which it is intended to use in the air line to blow over the slurry into the pipe 21. The air pressure is regulated by the valve 7 and is recorded on the gauge 8, the pipe 27 being closed off. The nitroguanidine slurry is forced through the pipe 10 and through the regulating valve 11 into the pipe 20 and thence into the vertical pipe 21. The steam inlet valve 12 is kept closed during working, but is opened to admit steam for cleaning purposes at the end of the day's run or between runs if necessary. Dry pressure steam is introduced into the jacket 14 through the valve 15, as a result of which the slurry in the pipe 21 becomes heated as it progresses down the pipe. The rate of flow of the slurry and the dry steam pressure are adjusted so that the nitroguanidine is all dissolved only as it approaches the filter candle 17. Only extraneous matter is thus retained on the filter. As the liquid emerges from the fine jet 19 it is atomised into the form of a cloud of droplets which are rapidly cooled by boiling of a part of their water content occasioned by the sudden release of pressure as then emerge, with the result that crystallisation of the nitroguanidine in each droplet takes place in the desired form.

While the apparatus hereinbefore described and illustrated has only one unit for heating the slurry and atomising the resulting solution leading from the vessel in which the slurry is heated at a temperature not exceeding 100° C., more than one such unit may be provided for each said vessel, if desired. Means may also be provided for circulating a portion of the slurry externally from and back to the vessel in which it is heated to a temperature not exceeding about 100° C., and if desired the material transferred to the space in which it is further heated until the nitroguanidine dissolves may be a portion of the slurry in the external part of the circulation, instead of being taken from the interior of said vessel directly. A pump or the like may also be used to force the slurry into the heating space instead of forcing it over by compressed air. It will be understood, moreover, that the process can also be worked in a continuous fashion by supplying a cold slurry of nitroguanidine in water to a vessel in which it is heated to a temperature not exceeding about 100° C. but desirably to a temperature above 60° C. at a rate equal to that at which it is transferred to the space in which it is further heated until the nitroguanidine dissolves and from which it is sprayed. In many cases it may be more convenient to have the vessel in which the slurry is heated to a temperature not exceeding about 100° C. open to the atmosphere and to force it from this vessel by means of a pump or the like into the space in which it is further heated until the nitroguanidine dissolves. In order to maintain at all times a minimal amount of the slurry at a temperature sufficiently high for decomposition to be comparatively rapid, the time rate of temperature increase in the space in which it is heated to the higher temperatures at which it dissolves should be as high as it can conveniently be made, and this is best attained by the use of a pipe having a high ratio of surface to internal volume, that is to say a long narrow pipe. We have found that the use of an externally heated pipe of not more than about ½ inch diameter is particularly useful, but it will usually be necessary to enlarge the diameter somewhat at the lower end of the pipe to accommodate the filter.

The invention is further illustrated by the following examples in which the parts are parts by weight:

*Example 1*

The nitroguanidine used is crude nitroguanidine obtained by drowning and washing with water the reaction mixture from the treatment of guanidine nitrate with sulphuric acid and has an acid value analytically determined of 400 milligrammes sodium hydroxide per 100 grammes reckoned on the dry material. A slurry of the moist crude nitroguanidine in water is made up in a jacket autoclave so as to contain 4 parts water for each part dry nitroguanidine, and to this is added 0.0085 part sodium acetate trihydrate crystals per part nitroguanidine. The contents are stirred by means of a mechanical stirrer and steam is run through the jacket of the slurry until the temperature is 80° C. The safety valve is set to operate at a pressure of 60 pounds per square inch, the manhole is then closed tightly, the cock of the compressed air supply is opened and the slurry is blown over under an air pressure of 50 to 55 pounds into a jacketed vertical pipe 13 feet long and ½ inch in internal diameter through the jacket of which steam at a pressure of 40 to 45 pounds is already running. The valves containing the steam pressure in the jacket of the pipe and the rate of flow of the slurry are adjusted so that the nitroguanidine dissolves as it approaches the filter, and the filtered solution is sprayed continuously through the terminal jet at which it enters at a temperature of about 135° C. The jet has a diameter of 0.046 of an inch, and the slurry travels along the whole length of the tube in about two-thirds of a minute. The emerging spray is collected in a cooled receptacle placed beneath the jet fitted with mechanical stirring, into which receptacle an independent spray of cold water amounting to twice or thrice the volume of the slurry is introduced so as to mingle with the fine spray from the jet. The filtered, washed, dried and gently milled product is in the form of fine crystals of which the predominating proportion have a size of about 3 micromillimetres and a length of about 20 to 40 micromillimetres and have a negligible acid value. The rate at which the slurry is mechanically stirred in the pressure vessel may be diminished, for instance from about 300 revolutions per minute to about 100 revolutions per minute as the temperature of the slurry rises to 80° C.

Other heating fluids than dry saturated steam at superatmospheric pressure may be used for heating the vertical pipe, for instance, glycerine, mineral oil, or hot gases. The slurry may conveniently contain from about 2 to 5 parts water for each part of dry nitroguanidine, and it will be understood the higher the temperature to which the slurry is heated, the less solvent will be required.

*Example 2*

The crude nitroguanidine used is the same as in Example 1. In this case the slurry contains 3½ parts water per part nitroguanidine and .0055 part calcium carbonate are employed per part nitroguanidine. The slurry is transferred to a steam jacketed pipe, as in Example 1, but the valves are adjusted so that the slurry takes twelve seconds to travel along the pipe and attains a temperature of 142° C. as it approaches the filter, by which time the nitroguanidine has dissolved. The product obtained is similar to that of Example 1. The jet diameter is 0.081 of an inch.

It is a particular advantage of our invention that an agent capable of diminishing the acidity of the mixture may be introduced. This may advantageously be introduced before heating of the slurry is commenced. It is not desirable that the pH of the solution should, at any stage, exceed 9, as measured at ordinary temperature, and if desired buffering agents may be employed to assist in depressing the alkalinity of ordinary alkaline materials for this purpose. However, such materials as substantially insoluble carbonates and salts of volatile or insoluble acids may be employed provided they are capable of reacting with sulphuric acid to form salts of substantially neutral reaction, and that the acid liberated from them can be eliminated by filtration or otherwise in the course of the process, or subsequent drying of the product.

As many apparently widely different embodiments of the invention can be made without departing from the spirit and scope thereof, it must be understood that the invention is not limited to any specific embodiment except as defined in the appended claims.

We claim:

1. The method of crystallizing nitroguanidine which comprises providing a relatively large body of a slurry comprising as its essential constituent nitroguanidine and an amount of water insufficient to dissolve it at a temperature below 120° C. but at least sufficient to dissolve it at a temperature not exceeding 160° C., maintaining said relatively large body of slurry at a temperature not exceeding 100° C., withdrawing a progressively renewed relatively small fraction thereof as a stream and passing said relatively small fraction under pressure through a relatively small heating space in which the small fraction is rapidly heated to a temperature at least 120° C. and not exceeding 160° C., and sufficient to dissolve the nitroguanidine, and forthwith atomizing the resulting stream of solution into a region maintained at a pressure not substantially exceeding atmospheric.

2. A method as defined in claim 1 wherein the atomized cloud of droplets is contacted with cold water.

3. A method as defined in claim 1 wherein the temperature of the relatively large body of slurry is within the range of from about 60° to about 100° C.

4. A method as defined in claim 1 wherein the relatively small stream of slurry is heated to solution temperature in not exceeding approximately 30 seconds.

5. A method as defined in claim 1 wherein the relatively small stream of slurry is heated to solution temperature in about 10 seconds.

6. A method as defined in claim 1 wherein the slurry contains a weakly basic substance adapted to reduce the acidity of the nitroguanidine but which does not cause the pH of the mixture as measured at atmospheric to exceed 9.

7. The method of purifying nitroguanidine containing occluded sulfuric acid which comprises providing a relatively large body of a slurry comprising as its essential constituent nitroguanidine containing the said occluded impurity, an amount of water insufficient to dissolve the nitroguanidine below 120° C. but at least sufficient to dissolve it at a temperature not exceeding 160° C., and a weakly basic substance adapted to give the slurry a pH not exceeding 9, maintaining said relatively large body of slurry at a temperature not exceeding 100° C., withdrawing a progressively renewed relatively small fraction thereof as a stream and passing said relatively small fraction through a relatively small heating space in which the small fraction is rapidly heated to a temperature at least 120° C. and not exceeding 160° C., and sufficient to dissolve the nitroguanidine, and forthwith atomizing the resultant stream of solution into a region maintained at a pressure not substantially exceeding atmospheric.

8. The method as defined in claim 7 wherein the amount of weakly basic substance used is sufficient to react with the whole of the occluded sulfuric acid.

9. The method as defined in claim 7 wherein the said resultant stream of nitroguanidine solution is filtered immediately before atomizing.

FRANK DOUGLAS MILES.
HARRY JACKSON.